(12) United States Patent
Shi et al.

(10) Patent No.: US 8,488,896 B2
(45) Date of Patent: Jul. 16, 2013

(54) IMAGE PROCESSING APPARATUS AND IMAGE PROCESSING METHOD

(75) Inventors: Zhongchao Shi, Beijing (CN); Cheng Du, Beijing (CN); Tao Li, Beijing (CN); Gang Wang, Beijing (CN)

(73) Assignee: Ricoh Company, Ltd., Tokyo (JP)

( * ) Notice: Subject to any disclaimer, the term of this patent is extended or adjusted under 35 U.S.C. 154(b) by 1097 days.

(21) Appl. No.: 12/453,500

(22) Filed: May 13, 2009

(65) Prior Publication Data

US 2009/0290796 A1 Nov. 26, 2009

(30) Foreign Application Priority Data

May 20, 2008 (CN) .......................... 2008 1 0100722

(51) Int. Cl.
- *G06T 3/4038* (2006.01)
- *G06T 5/001* (2006.01)
- *G06T 7/0081* (2006.01)
- *H04N 5/272* (2006.01)

(52) U.S. Cl.
USPC ........... 382/255; 382/173; 382/260; 382/264; 382/284; 348/586

(58) Field of Classification Search
CPC ....... G06T 3/4038; G06T 5/001; G06T 7/0081; H04N 5/272
USPC ......... 382/173, 284, 255, 260, 264; 348/586, 348/E09.055

See application file for complete search history.

(56) References Cited

U.S. PATENT DOCUMENTS

| | | | |
|---|---|---|---|
| 5,668,605 A * | 9/1997 | Nachshon et al. | 348/584 |
| 6,646,687 B1 * | 11/2003 | Vlahos | 348/586 |
| 6,952,286 B2 * | 10/2005 | Luo et al. | 358/1.9 |
| 7,623,728 B2 * | 11/2009 | Avinash et al. | 382/275 |
| 7,657,171 B2 * | 2/2010 | Sundstrom | 396/133 |
| 7,783,075 B2 * | 8/2010 | Zhang et al. | 382/103 |
| 2008/0123960 A1 * | 5/2008 | Kim et al. | 382/173 |

* cited by examiner

*Primary Examiner* — Matthew Bella
*Assistant Examiner* — Jose M Torres
(74) *Attorney, Agent, or Firm* — Harness, Dickey & Pierce, P.L.C.

(57) ABSTRACT

An image processing apparatus and an image processing method blurs a background portion of an image. The image processing apparatus includes an image acquiring unit for acquiring original image data; an image processing unit for separating background pixels from foreground pixels in the original image; an image filtering unit for filtering the background pixels; and an image merging unit for merging the foreground pixels with the filtered background pixels in order to generate a new image having a blurred background.

16 Claims, 11 Drawing Sheets

IMAGE PROCESSING APPARATUS AND IMAGE PROCESSING METHOD

BACKGROUND OF THE INVENTION

1. Field of the Invention

The present invention generally relates to image processing apparatuses and image processing methods, and particularly to a technology for blurring an image.

2. Description of the Related Art

Digital products such as computers and digital television sets have been improved greatly over the years and they have now become very common. Digital image acquiring equipment such as digital cameras and digital video cameras is now so widespread that they seem almost certain to replace the conventional film cameras.

Images acquired using a digital camera or the like can be directly displayed on a digital device such as a computer, a digital television set, or a cellular phone, in addition to being printed on paper, thus providing greater joy to the people's lives. Also, image processing technologies that were originally developed for specialized purposes, such as medical devices, remote sensing devices, and communications devices, are increasingly affecting the people's daily lives. As of now, the state-of-the-art digital cameras already have resolution in excess of one million pixels.

When a conventional film camera is used, the parameters of the camera can be controlled to adjust the depth of field in order to obtain a photograph with a clear foreground and a blurred background. For example, when taking a picture of a person, the lens is precisely focused at the eye of the photographed person in accordance with the principle of imaging. As a result, the background of the person does not become clear due to the difference in object distance. When someone views the photograph, he or she does not notice the blurred background and instead immediately focuses their eyes on the clearest foreground. This is how a good personal photograph is taken.

Because the size of the CCD (charge coupled device) in digital cameras is smaller than the film, the digital cameras have greater depths of field. This means that, when a far object is photographed with a digital camera, it is harder to obtain the effect of the enhanced foreground and the blurred background or unwanted portions in a scene. In order to reproduce the background blurring function of the conventional film cameras, an experienced photographer may utilize image processing software. The work involved, however, takes a long time, and the finish varies depending on the experience level of the photographer.

The conventional art offers several methods for realizing the background blurring function. For example, a single frame of basic image is selected from a sequence of images, and a background region and a foreground region are generated using the other images. By blurring the background region, an image with the blurred background can be generated. In another example, an image having a high dynamic range is generated using two images with different exposure values, and the background of the generated image is blurred.

The image blurring technique can be used to enhance a baseball game scene, for example, in order to improve the effects of the game. In this case, the blurred area may be finalized depending on changes in the scene. Several overlays may be stored in memory in advance, so that an overlay and a photograph can be merged to obtain a blurred image.

In any of the aforementioned existing methods, plural images are used for realizing image blurring. However, use of plural images is associated with the problem of image registration, the accuracy of which directly influencing the generated image effect. In addition, it is sometimes difficult to obtain two images with exactly identical scenes.

SUMMARY OF THE INVENTION

It is a general object of the present invention to provide an image processing apparatus and an image processing method wherein one or more of the aforementioned problems are eliminated.

A more specific object is to provide an image processing apparatus and an image processing method for segmenting a digital image into regions.

In one aspect of the present invention, an image processing apparatus includes an image acquiring unit configured to acquire image data about an original image; an image processing unit configured to separate a background pixel from a foreground pixel in the original image; an image filtering unit configured to filter the background pixel; and an image merging unit configured to merge the foreground pixel and the filtered background pixel to generate a new image having a blurred background.

In another aspect of the present invention, an image processing method includes an image acquiring step of acquiring image data about an original image; an image processing step of separating a background pixel from a foreground pixel in the original image; an image filtering step of filtering the background pixel; and an image merging step of merging the foreground pixel and the filtered background pixel in order to generate a new image having a blurred background.

BRIEF DESCRIPTION OF THE DRAWINGS

These and other objects, features and advantages of the invention will be apparent to those skilled in the art from the following detailed description of the invention, when read in conjunction with the accompanying drawings in which.

DETAILED DESCRIPTION OF THE PREFERRED EMBODIMENTS

Hereafter, various embodiments of the present invention are described with reference to the drawings in which like reference characters refer to the same or corresponding parts throughout the different views.

Figure 1:
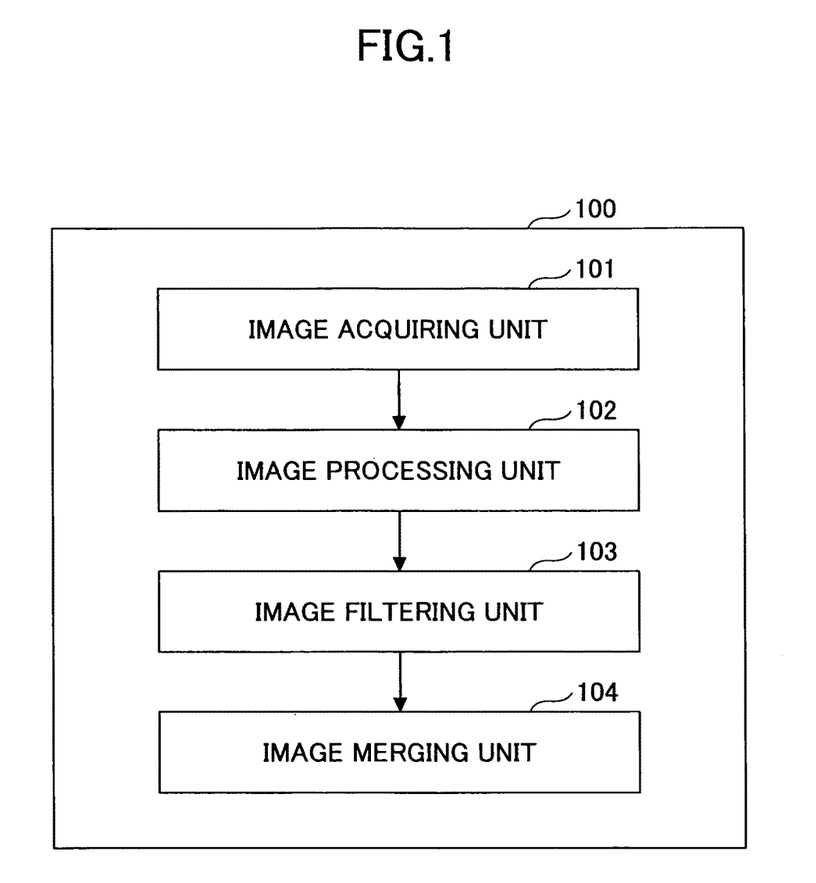
FIG. 1 shows a block diagram of an image processing apparatus according to an embodiment of the present invention.

An image processing apparatus 100 according to an embodiment of the present invention is described. FIG. 1 shows a block diagram of the image processing apparatus 100. As shown in FIG. 1, the image processing apparatus 100 includes an image acquiring unit 101 for acquiring image data about an original image; an image processing unit 102 for separating background (hereafter referred to as "BG") pixels of the original image from foreground (hereafter referred to as "FG") pixels thereof; an image filtering unit 103 for filtering the BG pixels; and an image merging unit 104 for merging the FG pixels and the filtered BG pixels.

Preferably, after the original image data is acquired, the image data is stored in a storage unit such as an internal memory. In accordance with an embodiment of the present invention, the input image may comprise a color image, where the acquired original image data includes the size of the image and the values of three channels for the individual pixels. By way of example, the size of the image acquired in advance is set at M×N pixels where M and N are natural numbers. Each pixel is displayed by the three channel values of red (R), blue (B), and green (G).

For example, when each channel value is stored in 8 bits, the value of each channel is in the range from 0 to 255. In the case of the R channel value, 0 indicates that the pixel contains little red, while 255 indicates that the pixel contains the maximum red. It goes without saying that the input image may be a grayscale image, where the same processing method as in the case of the color image may be used.

Figure 2:
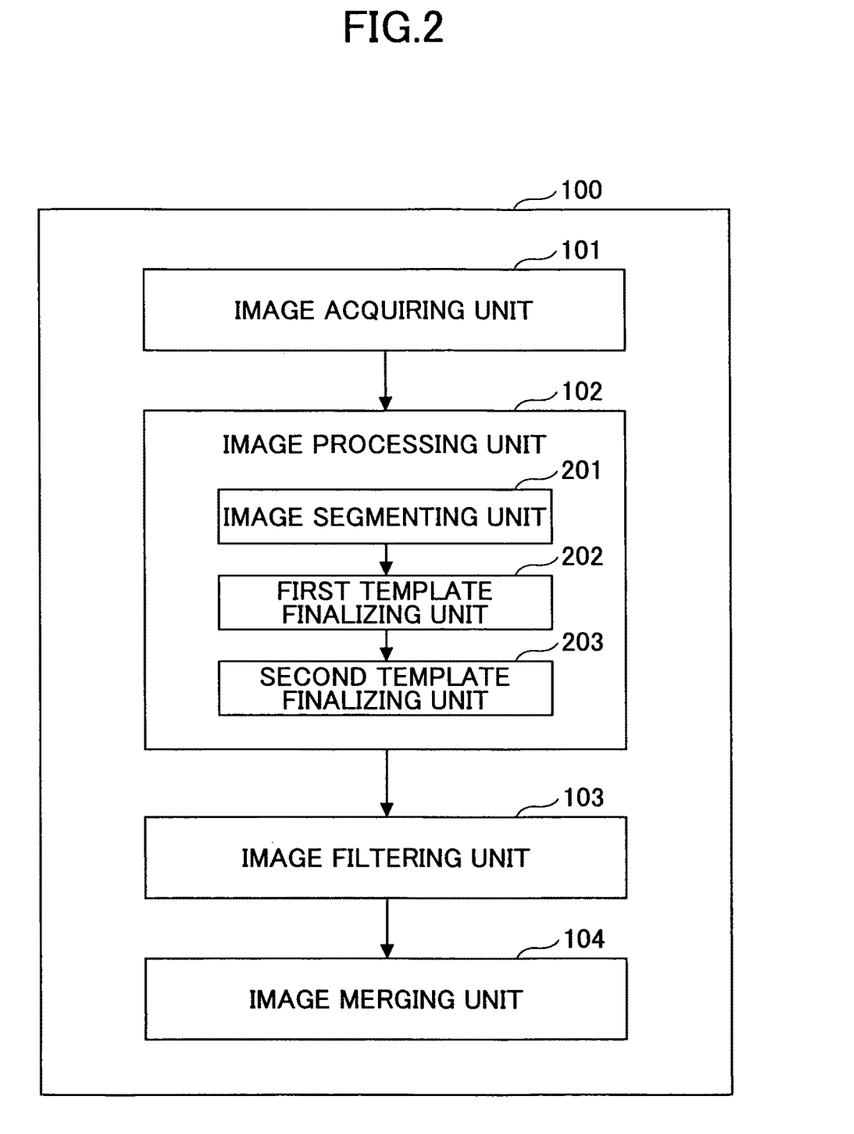
FIG. 2 shows a detailed block diagram of the image processing apparatus according to the embodiment of the present invention.

FIG. 2 shows a block diagram of the image processing apparatus 100 in greater detail. The image processing unit 102 includes an image segmenting unit (first image segmenting unit) 201 for segmenting an original image into plural first image segments; a first template finalizing unit (second image segmenting unit) 202 for extracting a FG/BG segment template for the original image; and a second template finalizing unit (image segmentation finalizing unit) 203 for finalizing a FG/BG pixel region template for the original image by determining whether the individual first image segments belong to the FG segment or the BG segment in the FG/BG segment template.

After the image data about the original image is acquired, the acquired original image data is sampled by the image segmenting unit 201, obtaining a segmentation image. In accordance with the present embodiment, the size of the segmentation image may be 320×240 pixels. The sampling of the original image for image segmentation may be performed using any of the technologies known to one skilled in the art. For example, the nearest-neighbor interpolation method or the bilinear interpolation method is used.

The image segmenting unit 201 may segment the segmentation image into plural irregular first image segments depending on different objects contained in the segmentation image, wherein the individual first image segment may include either an object or a part of an object. In accordance with the present embodiment, an ideal segmentation result is where there is an over-segmentation of an image and not a lack of segmentation. By "over-segmentation" is meant that an object in an image is divided into plural segments; plural objects must not exist in an individual segment.

Thousands of papers have been submitted by researchers proposing a number of segmenting methods. It is also possible to segment the original image based on the color information, grayscale information, or edge information about the image.

Figure 3:
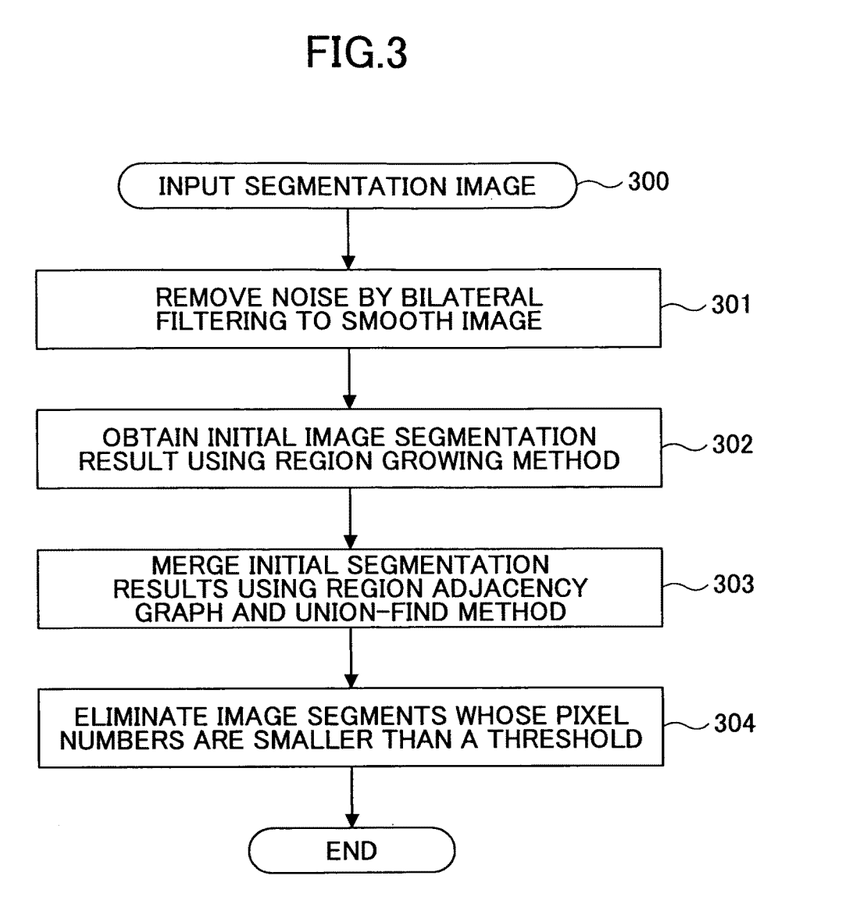
FIG. 3 shows a flowchart of a segmentation algorithm used in an embodiment of the present invention.

FIG. 3 shows a flowchart of a segmentation algorithm used in an embodiment of the present invention, which includes the following steps:

Step 300: A segmentation image to be segmented into first image segments is inputted based on the image data about the original image.

Step 301: Noise in the segmentation image is removed by bilateral filtering method, thereby smoothing the image.

Step 302: The segmentation image is segmented into smaller image segments by the region growing method. The region growing method, which is a typical image growing method, may involve expanding a region starting from an arbitrarily set start point based on similarity between pixels, until the similarity between a new pixel and the relevant region exceeds a certain threshold. A new start point is then selected and the similar operation is repeated until all of the pixels are given labels.

Step 303: Initial segmentation results are fused using a region adjacency graph and the union-find method.

Step 304: Image segments with a number of pixels smaller than a preset threshold are removed, obtaining a final segmentation result.

Figure 4A:
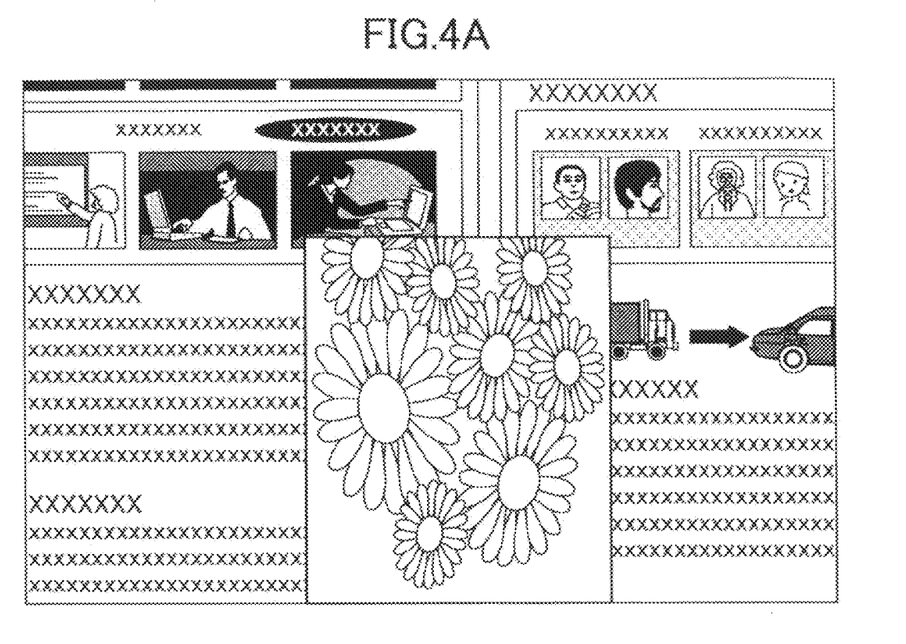
FIG. 4A shows an example of an original image acquired.
Figure 7A:
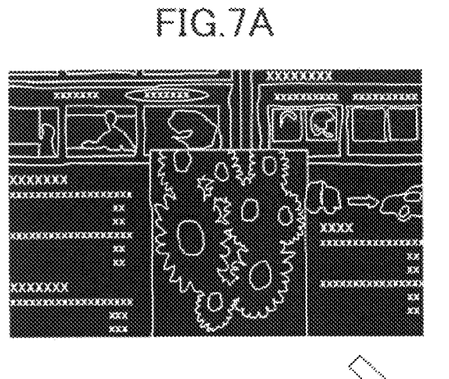
FIGS. 7A through 7D show an image blurring process according to an embodiment of the present invention.

FIG. 7A shows an image obtained as a result of segmenting the image shown in FIG. 4A by the aforementioned segmentation method.

In accordance with a preferred embodiment of the present invention, the first template finalizing unit 202 includes an image distance information acquiring unit for segmenting the original image into plural second image segments using a predetermined segmenting method, in order to obtain image distance information about the second image segments. The first template finalizing unit 202 also includes a separating unit for obtaining the aforementioned FG/BG segment template by separating a FG object from a BG object in the original image based on the image distance information about the individual second image segments. The image distance information about the image segments refers to either an absolute distance or a relative distance between a subject corresponding to the image segment and the image acquiring unit when image data in which the image segment exists is acquired. The various divided second image segments may have the same or different sizes and may include a single or plural pixels.

Figure 5:
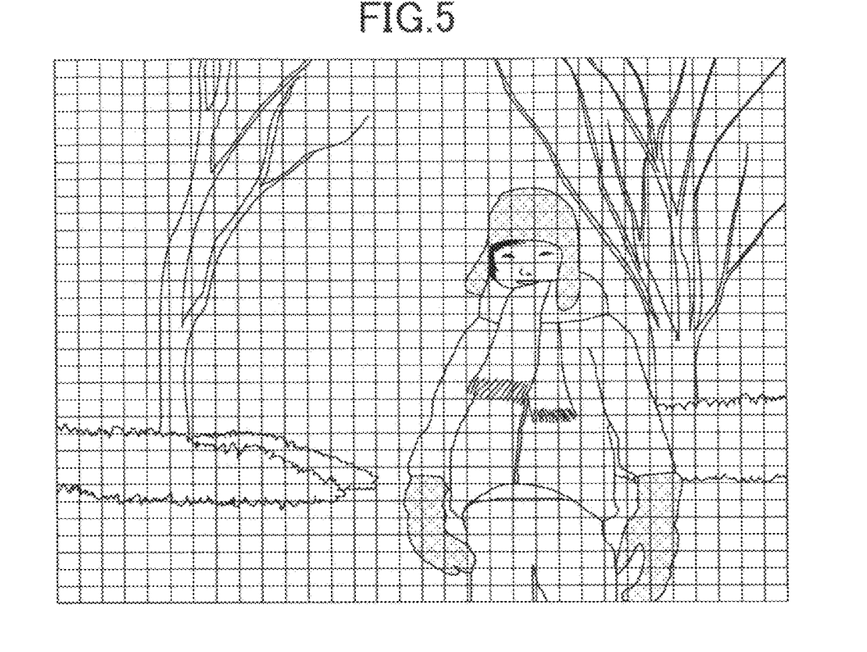
FIG. 5 illustrates how an image is segmented according to an embodiment of the present invention.

FIG. 5 shows image segments obtained by segmenting a single sample image into plural second image segments using the image distance information acquiring unit in accordance with an embodiment of the present invention. In this embodiment, the original image is divided into 32 equal parts both horizontally and vertically, thereby generating 1024 second image segments. From all of the scanned frames of the individual second image segments, image distance information is acquired from the clearest frame and used as a distance information label for the particular second image segment. Thus, distance information about the image can be acquired.

Figure 6:
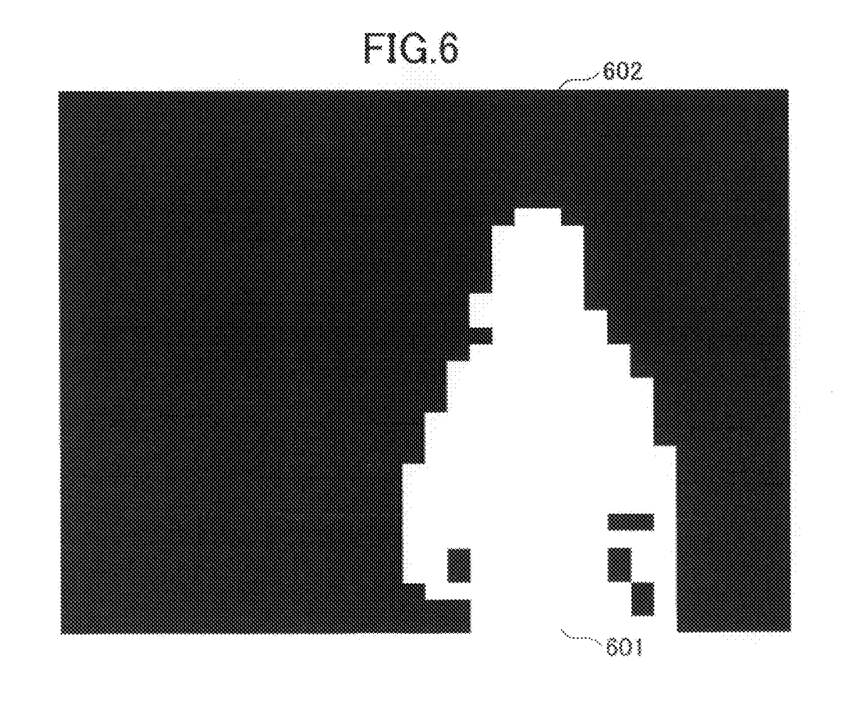
FIG. 6 shows ideal distance information obtained in accordance with the segmentation shown in FIG. 5.

FIG. 6 shows ideal distance information obtained from the image segments shown in FIG. 5. It can be seen from FIG. 6 that the FG object, i.e., a girl, is properly separated from the BG object, producing the two regions, i.e., a FG object region 601 and a BG region 602. When there are no isolated points or holes in the background as shown in FIG. 6 and ideal distance information about the image with clear outlines is acquired, the FG object and the BG object can be directly separated based on the ideal distance information, so that the FG/BG segment template for the image can be acquired. Obviously, the ideal distance information cannot be normally obtained in actual applications due to noise or the accuracy limit of the image acquiring apparatus. Thus, a final FG/BG segmented figure needs to be obtained in combination with other steps.

In accordance with a preferred embodiment of the present invention, the first template finalizing unit 202 includes an image distance information acquiring unit. The image distance information acquiring unit is configured to divide the original image into the second image segments in accordance with a preset segmenting method, and acquire image distance information about each of the second image segments. The first template finalizing unit 202 also includes an image focus region information acquiring unit. The image focus region information acquiring unit is configured to acquire focus region information about the original image.

The first template finalizing unit 202 according to the present embodiment further includes a FG object frame-range-number finalizing unit. The FG object frame-range-number finalizing unit is configured to acquire information about the second image segments that enter the focus region based on the image distance information about the individual second image segments and the focus region information, in order to finalize a range of the number of frames ("frame number range") of the FG object based on the information about the second image segments that enter the focus region.

The first template finalizing unit 202 also includes a first template acquiring unit (separating unit). The first template acquiring unit is configured to separate the FG object from the BG object in the original image based on the image distance information about the individual second image segments and the frame number range of the FG object, in order to acquire the FG/BG segment template for the original image.

In accordance with the present embodiment, the function of the image distance information acquiring unit is the same as that of the foregoing embodiment, and also the original image segmentation process is similar to the foregoing embodiment. In accordance with the present embodiment, the image distance information acquiring unit can acquire the distance information about the image simultaneously as the data acquiring unit acquires the image data. Further, the image focus region information acquiring unit can acquire the focus region information about the image simultaneously as the image data is acquired by the image data acquiring unit.

For example, when a photograph or a video is taken with a digital camera or a video camera, the distance information and the focus region information about the photograph can be simultaneously obtained. The "distance information" about the photograph herein refers to the distance between an individual subject in a scene corresponding to the photograph taken and the camera or video camera.

The focus region information in accordance with the present embodiment includes information about the position and size of the focus region. The focus region information provides the coordinates of the focus region. Based on the coordinates information and the acquired image distance information, information about each second image segment that enters the focus region can be acquired.

The image distance information about the individual second image segment that enters the focus region provides the frame number range of the FG object. Specifically, when the frame number range is calculated, an average value of the distance information about all of the second image segments that enter the focus region is acquired, and the frame number range is obtained by setting a difference between preceding and subsequent frames.

For example, suppose that the average value is a reference value d, the preceding frame difference is $\Delta 1$, and the subsequent frame difference is $\Delta 2$. Then, the frame number range of the FG object is $[d-\Delta 1, d+\Delta 2]$. In other words, all of the second image segments whose image distance information is positioned within $[d-\Delta 1, d+\Delta 2]$ belong to the FG object, while the other second image segments belong to the BG object, wherein $\Delta 1$ and $\Delta 2$ may or may not be the same.

Alternatively, by analyzing the distance information about the second image segments that enter the focus region statistically, a maximum value dmax and a minimum value dmin may be extracted, thereby determining the frame number range. The frame number range in this case is [dmin, dmax], where all of the second image segments whose image distance information is within the [dmin, dmax] range belong to the FG object, while the other second image segments belong to the BG object.

After the frame number range is thus acquired, the individual second image segments are divided based on the image distance information about the individual second image segments, thereby generating the FG/BG segment template.

Figure 4B:
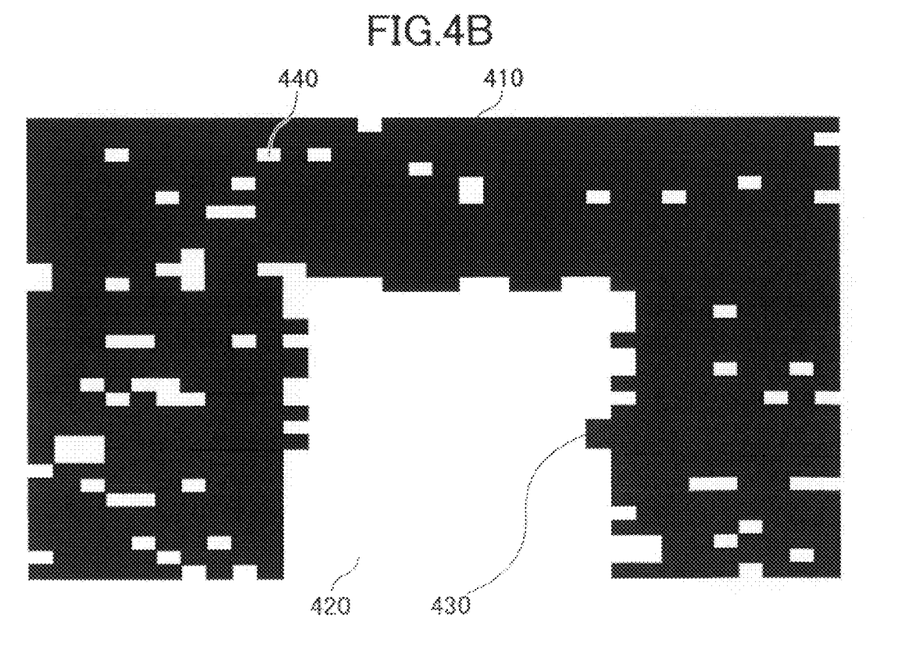
FIG. 4B shows an FG/BG segment template for the original image shown in FIG. 4A.

FIG. 4B shows the FG/BG segment template obtained by the above method for an image shown in FIG. 4A. The FG/BG segment template includes the two regions, a FG segment region 420 and a BG segment region 410. As seen from FIG. 4B, there are a number of isolated foreground points 440 in the background of the template, and there are also holes in the foreground due to background points 430, thus making the template incomplete. These isolated points and holes adversely affect the process of segmenting the foreground and the background, resulting in a decrease in the blurred background effect.

Figure 4C:
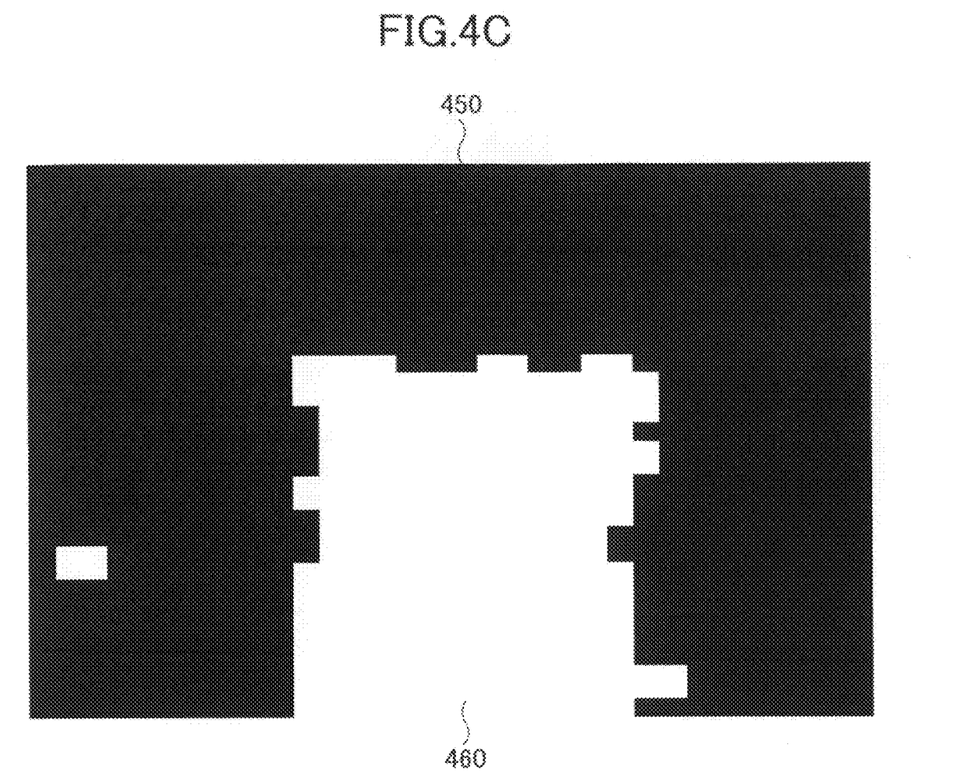
FIG. 4C shows an FG/BG segment template obtained by performing an optimizing process on the FG/BG segment template shown in FIG. 4B.

In accordance with a preferred embodiment, these isolated points and holes are removed using an optimizing unit so that an optimized FG/BG segment template for the image can be obtained. For example, the isolated points and holes are removed by a morphological method, such as erosion and dilation. A result is shown in FIG. 4C where, as a result of the morphological processing, the initial template shown in FIG. 4B is transformed into a better FG/BG segment template. Compared with FIG. 4B, the BG segment 450 and the FG segment 460 of the improved FG/BG segment template shown in FIG. 4C are deprived of the isolated points or holes. FIGS. 4A, 4B, and 4C thus show an example of processing of the FG segment and the BG segment.

Figure 7B:
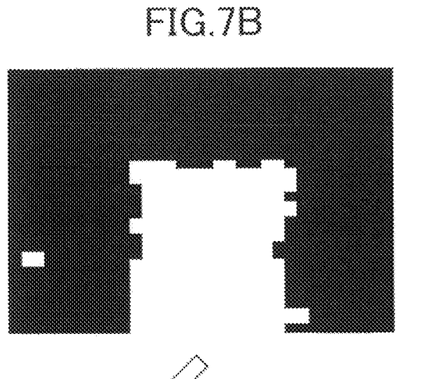
Figure 7C:
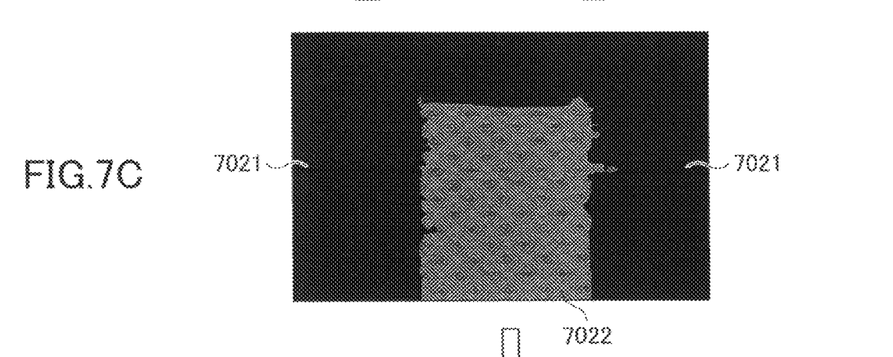

FIG. 7A shows a segmentation result (first image segments) obtained by the image segmenting unit, and FIG. 7B shows the FG/BG segment template obtained for the original image, in accordance with an embodiment of the present invention. The FG/BG segment template shown in FIG. 7B is the same as that shown in FIG. 4C. Thus, a ratio of the number of pixels in the FG segment to the number of pixels in the BG segment in each first image segment can be determined. Based on this ratio, it is determined whether the individual first image segment belongs to the FG segment or the BG segment. As a result, the FG/BG pixel region template shown in FIG. 7C is generated, wherein there exist an FG pixel region 7022 and a BG pixel region 7021.

Preferably, the second template finalizing unit 203 includes a first image segment determination unit and a second template acquiring unit (pixel region finalizing unit). The first image segment determination unit may be configured to calculate the ratio of the number of pixels that enter the FG segment to the number of pixels that enter the BG segment in each first image segment. When the ratio is equal to or greater than a predetermined threshold, the first image segment determination unit determines that the first image segment belongs to the FG segment. When the ratio is smaller than the threshold, the first image segment determination unit determines that the first image segment belongs to the BG segment.

The second template acquiring unit may be configured to acquire a FG/BG pixel region template for the original image by using the pixels of each of the first image segments belonging to the FG segment as the original image FG pixels and the pixels of each of the first image segments belonging to the BG segment as the original image BG pixels.

Figure 7D:
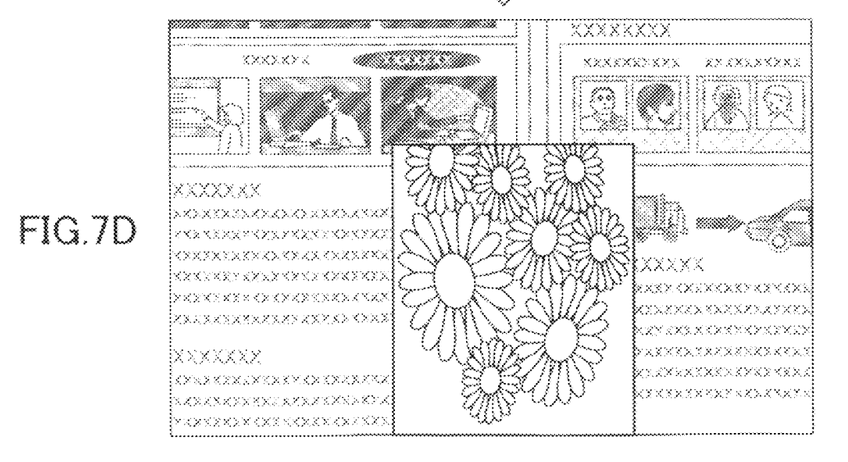

After the FG/BG pixel region template is acquired, the FG pixels of the original image can be separated from the BG pixels thereof using the FG/BG pixel region template and also with reference to the image data about the original image. The BG pixels are then filtered to blur them. The filtering may be performed using a Gaussian filter or a median filter. The separated FG pixels and the filtered BG pixel information are then merged, whereby a new merged image is generated. FIG. 7D shows a new, background-blurred image generated by subjecting the BG pixels of the image shown in FIG. 4A to a Gaussian filter, showing the image effect after the BG blurring process. FIG. 7 thus illustrates the image BG blurring process.

In accordance with another embodiment of the present invention, the process for acquiring the FG pixels and the BG pixels is the same as in the foregoing embodiment. After the FG/BG pixel region template is obtained, the distance between each BG pixel and the FG pixels is calculated by a distance-varying method, thereby generating gradual background labels. The distance-varying method may involve calculating the shortest distance between each BG pixel and the FG pixel region in the FG/BG pixel region template. Based on the acquired shortest distance information, a certain distance threshold is provided, and the background is divided into plural layers of regions in accordance with the distance threshold.

Figure 8A:
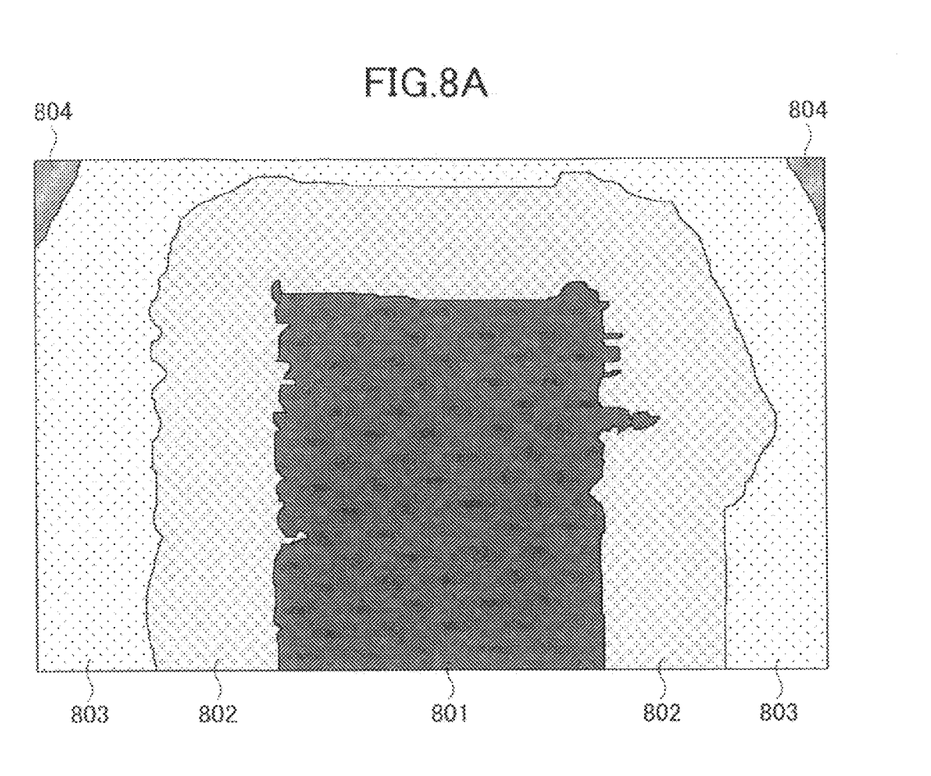
FIG. 8A shows a gradual FG/BG pixel region template.

FIG. 8A shows a gradual FG/BG pixel region template obtained from the template shown in FIG. 7C by the above process. The gradual FG/BG pixel region template may be realized by a gradual processing module contained in the image processing unit 102. In accordance with the present embodiment, the BG pixels in the gradual template are divided into first, second, and third layers. The BG pixels in the first layer are the closest to the FG pixels. The BG pixels in the third layer are the farthest from the FG pixel region.

FIG. 8A shows, from the inside toward the outer edges, an FG pixel region 801, a BG pixel region 802 of the first layer, a BG pixel region 803 of the second layer, and a BG pixel region 804 of the third layer. It goes without saying that the BG pixels may be divided into not just the three layers as shown but also two layers, or more than three layers, depending on the particular needs of the user.

Figure 8B:
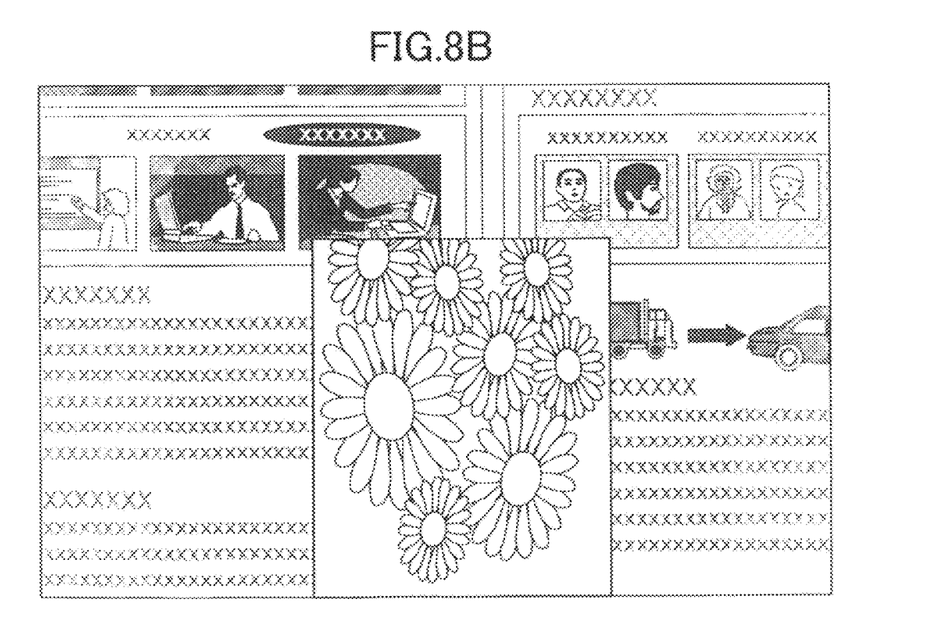
FIG. 8B shows the effect after the gradual BG blurring process.

After the gradual FG/BG pixel region template is acquired, the BG pixels in the different layers are filtered by the image filtering unit, using different filtering parameters. As a result, there can be obtained the effect that the degree of blurring increases with increasing distance from the foreground, as shown in FIG. 8B. FIGS. 8A and 8B thus show the gradual BG blurring process.

Figure 9:
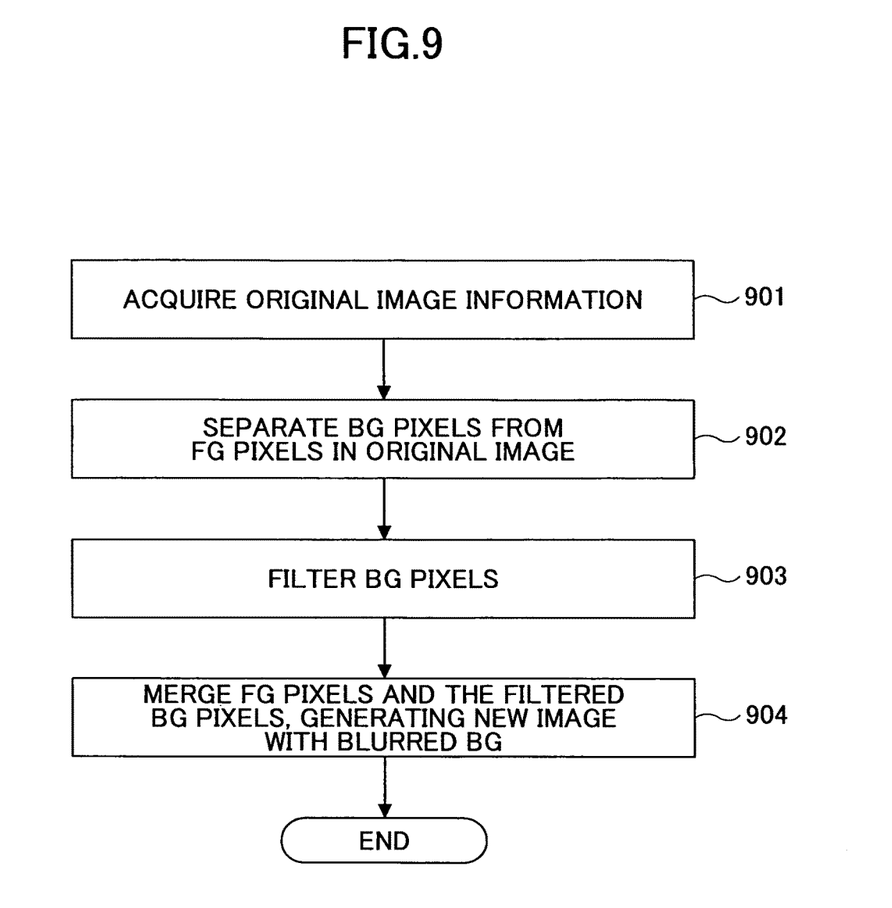
FIG. 9 shows a flowchart of an image processing method according to an embodiment of the present invention.

In accordance with another embodiment of the present invention, an image processing method is provided. FIG. 9 shows a flowchart of the image processing method. As shown, the method includes the following steps:

Step 901: Image data about an original image is acquired.
Step 902: The BG pixels of the original image are separated from the FG pixels thereof.
Step 903: The BG pixels are filtered.
Step 904: The FG pixels and the filtered BG pixels are merged, thus generating a new image with a blurred background.

The step of separating the BG pixels of the original image from the FG pixels thereof (step 902) may include separating the original image into plural first image segments; finalizing an FG/BG segment template for the original image; and finalizing an FG/BG pixel region template for the original image based on whether the individual first image segment belongs to a FG segment or a BG segment in the FG/BG segment template.

In a preferred embodiment, the step of finalizing the FG/BG segment template for the original image includes dividing the original image into plural second image segments using a preset segmenting method; acquiring image distance information about each of the second image segments; and separating a FG object from a BG object in the original image based on the image distance information about the individual second image segment, thereby acquiring the FG/BG segment template.

In a preferred embodiment, the step of finalizing the FG/BG segment template for the original image includes segmenting the original image into plural second image segments by a preset segmenting method; acquiring image distance information about each of the second image segments; acquiring focus region information about the original image; acquiring information about the second image segment that enters the focus region based on the acquired image distance information about the individual second image segment and the focus region information; finalizing a frame number range of the FG object based on the information about the second image segment that enters the focus region; separating the FG object from the BG object in the original image based on the image distance information about the individual second image segment and the frame number range of the FG object, thereby acquiring the FG/BG segment template for the original image.

In a preferred embodiment, the method may further include, after finalizing the FG/BG segment template for the original image, performing an optimizing process for removing isolated points or holes in the FG/BG segment template.

In another preferred embodiment, the step of finalizing the FG/BG pixel region template for the original image includes calculating a ratio of the number of pixels that enter the FG segment to the number of pixels that enter the BG segment in the individual first image segment. When the ratio is equal to or greater than a preset threshold, it is determined that the first image segment belongs to the FG segment. When the ratio is smaller than the threshold, it is determined that the first image segment belongs to the BG segment. The finalizing step further includes acquiring the FG/BG pixel region template for the original image by regarding the pixels of the individual first image segment that belongs to the FG segment as the FG pixels, and the pixels of the individual first image segment that belongs to the BG segment as the BG pixels.

In a preferred embodiment, the method includes, after finalizing the FG/BG pixel region template, calculating the shortest distance between each of the BG pixels and the FG pixel region using the FG/BG pixel region template. The method further includes dividing the shortest distance with reference to a predetermined distance threshold, thus dividing the BG pixel region into a predetermined number of plural layers, and generating a gradual FG/BG pixel region template for the BG pixels having the plural layers. The method further includes, after generating the gradual FG/BG pixel region template, filtering the BG pixels in the different layers using different filtering parameters.

Figure 10:
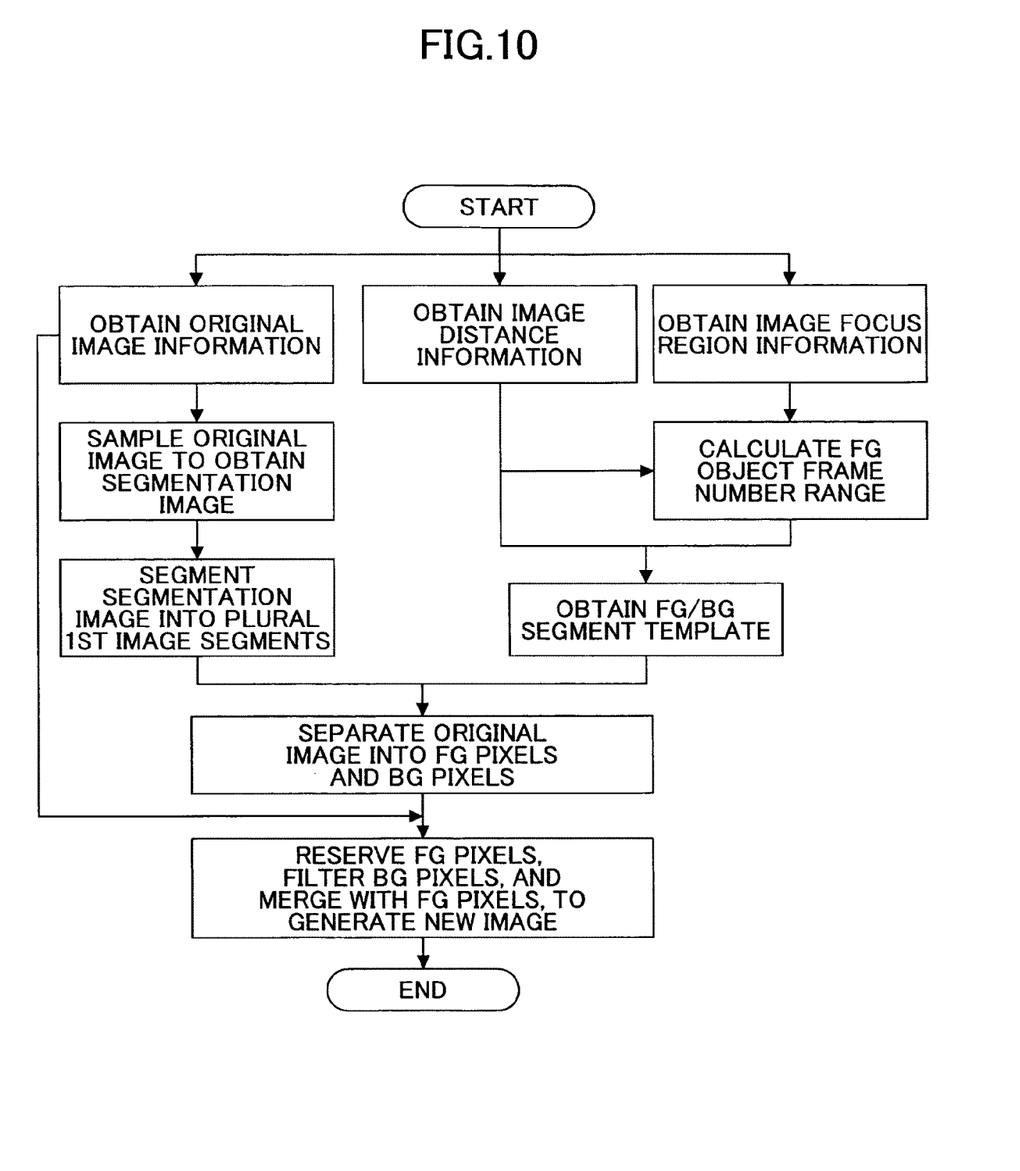
FIG. 10 shows a flowchart of an image processing method according to another embodiment of the present invention.

FIG. 10 shows a flowchart of an image processing method according to another embodiment of the present invention. The image processing method includes the following steps:

(a): Image data about an original image, image distance information, and focus region information are acquired, using an image data acquiring unit, an image distance information acquiring unit, and an image focus region information acquiring unit, respectively. For acquiring the image distance information, the original image is divided into plural second image segments using a preset segmenting method, and the image distance information for the individual second image segment is calculated. Description of the manner of calculation is omitted as reference may be made to the foregoing description about the image distance information acquiring unit.

(b): After the image data about the original image is acquired, a segmentation image is acquired based on the original image, and the segmentation image is divided into plural first image segments using a selected segmentation algorithm. The details of the image segmenting method are not described herein as reference may be made to the above description concerning the image segmenting unit.

(c): Based on the acquired image distance information and focus region information, a frame number range in the FG object, i.e., the range of the number of frames in a focus image, is calculated. The specific method of calculation is not described herein as reference may be made to the above description about the frame-number-range finalizing unit for the FG object.

(d): After the frame number range of the FG object is calculated, an FG/BG segment template for the original image is obtained based on the acquired image distance information. Isolated points or holes in the template are removed using a morphological method.

(e): Thereafter, based on the acquired segmentation result and the FG/BG segment template for the original image, the ratio of the number of pixels that enter the FG segment to the number of pixels that enter the BG segment in the individual first image segment is calculated. Then, based on that ratio, it is determined whether the first image segment belongs to the FG segment or the BG segment, whereby the pixel regions of the original image are separated into the FG pixels and the BG pixels, thus generating the FG/BG pixel region template. The specific generation process is not described herein as reference may be made to the above description of the second template finalizing unit.

(f): After the FG/BG pixel region template is acquired, the BG pixels of the original image are filtered using the template. The thus filtered BG pixels and the original FG pixels of the original image are then merged, whereby a new image is generated. The BG pixels in this image have the blurred effect due to the filtering.

In the above embodiment, steps (b), (c), and (d) are performed before step (e). Step (c) is performed before step (d). Steps (b) and (c) may be performed in any order.

Figure 11:
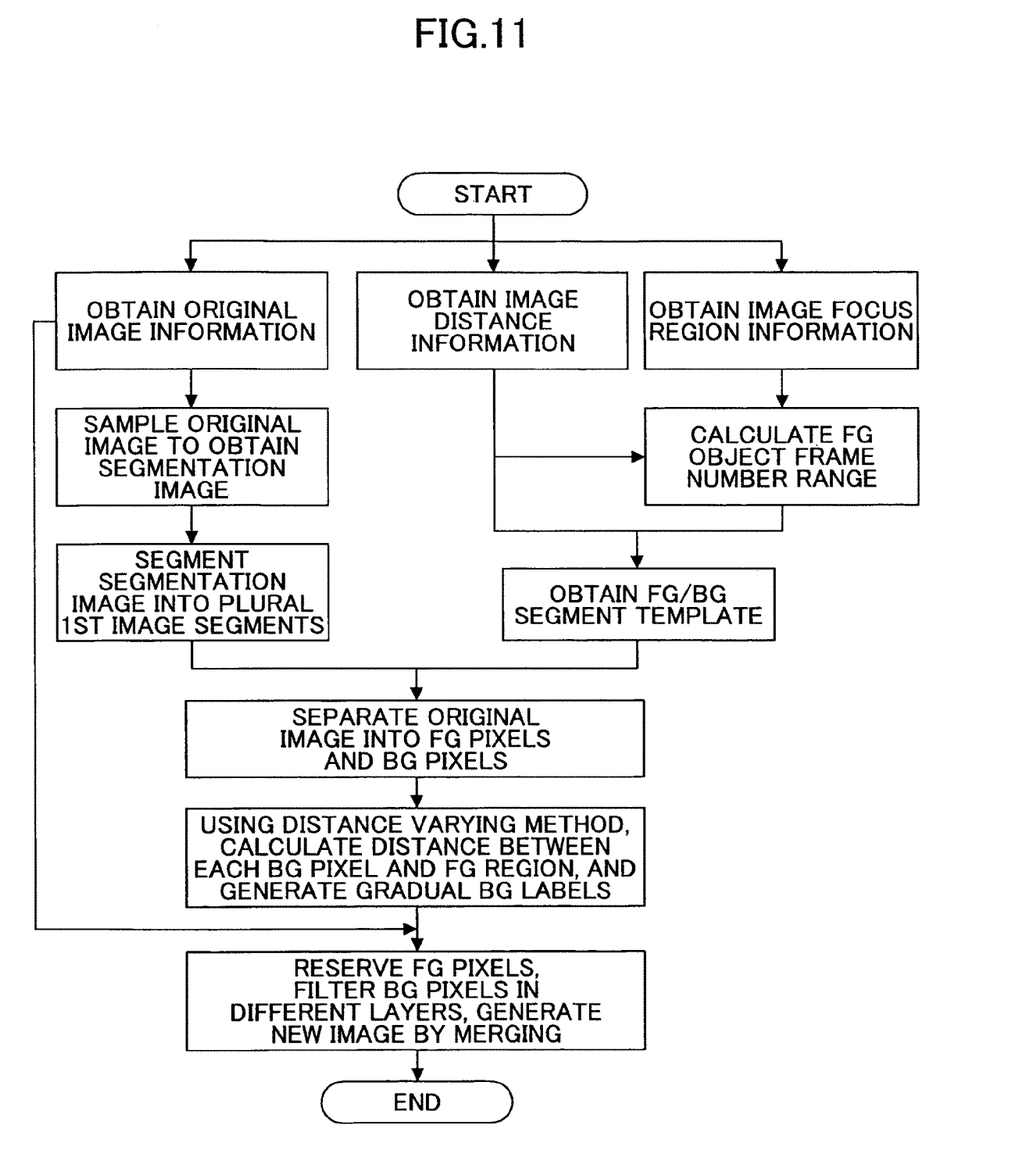
FIG. 11 shows a flowchart of an image processing method according to another embodiment of the present invention.

FIG. 11 shows a flowchart of an image processing method according to another embodiment of the present invention. As shown, the image processing method includes the following steps:

(a) through (e): These steps are the same as the corresponding steps of the embodiment shown in FIG. 10.

(f'): The distance between each of the BG pixels and the FG pixels is calculated using the distance varying method. Based on the calculated distance, gradual background labels are generated so that the BG pixels can be divided into a predetermined number of plural layers, obtaining a gradual FG/BG pixel region template. The specific distance varying method used is not described herein as reference may be made to the foregoing descriptions.

(g'): The BG pixels that belong to the different layers are filtered using different filtering parameters, while reserving the FG pixels. The degree of blurring is increased for the BG pixels in the layers that are farther from the FG pixel region. The degree of blurring is decreased for the BG pixels in the layers closer to the FG pixel region. The thus filtered BG pixels in the plural layers and the separated FG pixels are merged, whereby a new image is generated which has a gradual blurring effect.

Some or all of the steps of the above methods may be realized using a program executed on relevant hardware, as will be apparent to those skilled in the art. The program may be stored in a computer-readable recording medium. The program, when executed by one or more processors of an information processing apparatus, may carry out the following steps of acquiring original image data; separating the BG pixels of the original image from the FG pixels thereof; filtering the BG pixels; and merging the FG pixels and the filtered BG pixels to generate a new image having a blurred background effect.

The recording medium may include a read-only memory (ROM), a random access memory (RAM), a magnetic disk, an optical disc, and a universal serial bus (USB) flash memory.

The image processing apparatus according to an embodiment of the present invention may be used in a digital image acquiring apparatus, such as a digital camera or a digital video camera. A photograph or a video taken using such digital image acquiring apparatus is processed by the image processing apparatus. As a result, a photograph or a video having the blurred background effect can be obtained, in which an important portion is emphasized while the background is blurred. Thus, the depth of field sensing effect can be improved.

Although this invention has been described in detail with reference to certain embodiments, variations and modifications exist within the scope and spirit of the invention as described and defined in the following claims.

The present application is based on the Chinese Priority Application No. CN2008-10100722 filed May 20, 2008, the entire contents of which are hereby incorporated by reference.

What is claimed is:

1. An image processing apparatus comprising:
an image acquiring unit configured to acquire image data about an original image;
an image processing unit configured to separate a background pixel from a foreground pixel in the original image, the image processing unit including,
a first image segmenting unit configured to segment the original image into plural first image segments based on the image data,
a second image segmenting unit configured to segment the original image into a foreground segment and a background segment based on image distance information about the image data, the second image segmenting unit configured to separate subjects for each distance by using one of an absolute distance and a relative distance between each subject and the image acquiring unit if image data in which the subject exists is acquired, and
an image segmentation finalizing unit configured to finalize a foreground pixel region and a background pixel region in the original image based on whether the individual first image segments segmented by the first image segmenting unit belong to the foreground segment or the background segment segmented by the second image segmenting unit;

an image filtering unit configured to filter the background pixel; and an image merging unit configured to merge the foreground pixel and the filtered background pixel to generate a new image having a blurred background, wherein the second image segmenting unit includes, an image distance information acquiring unit configured to segment the original image into plural second image segments, and configured to acquire image distance information about each of the second image segments;

an image focus region information acquiring unit configured to acquire focus region information about a focus region in the original image;

a foreground object frame-number-range finalizing unit configured to acquire information about the second image segment that enters the focus region based on the image distance information about each of the second image segments and the focus region information, and configured to finalize a frame number range of a foreground object based on the information about the second image segment that enters the focus region; and a separating unit configured to acquire the foreground segment and the background segment of the original image by separating the foreground object from a background object in the original image based on the image distance information about each of the second image segments and the frame number range of the foreground object.

2. The image processing apparatus according to claim 1, wherein the first image segmenting unit is configured to segment the original image into the plural first image segments based on different objects contained in the original image,
wherein each of the individual first image segments includes an image of a single object or an image of a part of the single object.

3. The image processing apparatus according to claim 1, wherein the first image segmenting unit is configured to segment the original image based on at least one of color information, grayscale information, and edge information.

4. The image processing apparatus according to claim 1, wherein the second image segmenting unit includes:
an image distance information acquiring unit configured to segment the original image into plural second image segments, and configured to acquire image distance information about each of the second image segments; and
a separating unit configured to acquire the foreground segment and the background segment by separating a foreground object from a background object in the original image based on the image distance information about each of the second image segments.

5. The image processing apparatus according to claim 4, wherein the second image segments have the same or different sizes, and each of the second image segments includes a single or plural pixels.

6. The image processing apparatus according to claim 1, wherein the second image segmenting unit further includes an optimizing unit configured to remove an isolated point or a hole from the foreground segment and the background segment.

7. The image processing apparatus according to claim 1, wherein the foreground object frame-number-range finalizing unit is the frame number range of the foreground object by calculating an average value of the image distance information about all of the second image segments that enter the focus region, and then setting a preceding frame difference and a subsequent frame difference, or by acquiring a maximum value and a minimum value of the distance information about all of the second image segments that enter the focus region.

8. The image processing apparatus according to claim 1, wherein the image segmentation finalizing unit includes a first image segment determination unit and a pixel region finalizing unit,
wherein the first image segment determination unit is configured to calculate a ratio of the number of pixels that enter the foreground segment to the number of pixels that enter the background segment in each of the first image segments,
wherein, when the ratio is greater than or equal to a predetermined ratio threshold, the first image segment determination unit determines that the first image segment belongs to the foreground segment,
wherein, when the ratio is smaller than the ratio threshold, the first image segment determination unit determines that the first image segment belongs to the background segment, and
wherein the pixel region finalizing unit is configured to finalize the foreground pixel region and the background pixel region of the original image by regarding the pixels in each of the first image segments that belong to the foreground segment as foreground pixels, and regarding the pixels in each of the first image segments that belong to the background segment as background pixels.

9. The image processing apparatus according to claim 1, wherein the image processing unit further includes a gradual background generating unit configured to calculate a shortest distance between each of the background pixels and the foreground pixel region based on the foreground pixel region and the background pixel region, the gradual background generating unit dividing the shortest distance using a predetermined distance threshold so that the background pixel region can be divided into a predetermined number of plural layers, in order to generate gradual foreground and background pixel regions having a plurality of layers.

10. The image processing apparatus according to claim 9, wherein the image filtering unit is configured to filter the background pixels in the different layers using different parameters.

11. An image processing method comprising:
an image acquiring step of acquiring image data about an original image;
an image processing step of separating a background pixel from a foreground pixel in the original image, the image processing step including,
a first image segmenting step of segmenting the original image into plural first image segments based on the image data;
a second image segmenting step of segmenting the original image into a foreground segment and a background segment based on image distance information about the image data, the second image segmenting step separating subjects for each distance by using one of an absolute distance and a relative distance between each subject and an image acquiring unit if image data in which the subject exists is acquired; and
an image segmentation finalizing step of finalizing a foreground pixel region and a background pixel region in the original image based on whether the individual first image segments segmented in the first image segmenting step belong to the foreground segment or the background segment segmented in the second image segmenting step;

an image filtering step of filtering the background pixel; and an image merging step of merging the foreground pixel and the filtered background pixel in order to generate a new image having a blurred background, wherein the second image segmenting step includes, an image distance information acquiring step of segmenting the original image into plural second image segments, and acquiring image distance information about each of the second image segments;

an image focus region information acquiring step of acquiring focus region information about a focus region in the original image;

a foreground object frame-number-range finalizing step of acquiring information about the second image segment that enters the focus region based on the image distance information about each of the second image segments and the focus region information, and finalizing a frame number range of a foreground object based on the information about the second image segment that enters the focus region; and a separating step of acquiring the foreground segment and the background segment of the original image by separating the foreground object from a background object in the original image based on the image distance information about each of the second image segments and the frame number range of the foreground object.

12. The image processing method according to claim 11, wherein the first image segmenting step includes segmenting the original image into the plural first image segments based on different objects contained in the original image, wherein each of the individual first image segments includes an image of a single object or an image of a part of the single object.

13. The image processing apparatus according to claim 11, wherein the first image segmenting step includes segmenting the original image based on at least one of color information, grayscale information, and edge information.

14. The image processing method according to claim 11, wherein the second image segmenting step includes:

an image distance information acquiring step of segmenting the original image into plural second image segments, and acquiring image distance information about each of the second image segments; and a separating step of acquiring the foreground segment and the background segment by separating a foreground object from a background object in the original image based on the image distance information about each of the second image segments.

15. The image processing method according to claim 11, wherein the second image segmenting step further includes an optimizing step of removing an isolated point or a hole from the foreground segment and the background segment.

16. The image processing method according to claim 11, wherein the second image segments have the same or different sizes, and each of the second image segments includes a single or plural pixels.

\* \* \* \* \*